(12) United States Patent
Zheng et al.

(10) Patent No.: US 8,687,883 B2
(45) Date of Patent: Apr. 1, 2014

(54) METHOD AND A DEVICE FOR MERGING A PLURALITY OF DIGITAL PICTURES

(75) Inventors: Jinghong Zheng, Singapore (SG); Zhengguo Li, Singapore (SG); Susanto Rahardja, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 123 days.

(21) Appl. No.: 13/351,649

(22) Filed: Jan. 17, 2012

(65) Prior Publication Data

US 2012/0183210 A1 Jul. 19, 2012

Related U.S. Application Data

(60) Provisional application No. 61/433,534, filed on Jan. 18, 2011, provisional application No. 61/461,658, filed on Jan. 21, 2011.

(51) Int. Cl.
*G06K 9/00* (2006.01)

(52) U.S. Cl.
USPC ........... 382/167; 382/162; 382/274; 382/260; 345/589; 345/597

(58) Field of Classification Search
USPC .......... 382/162, 167, 274, 260; 345/589, 597, 345/601, 605; 348/649, 453, 222.1
See application file for complete search history.

(56) References Cited

U.S. PATENT DOCUMENTS

| 6,781,583 | B2 * | 8/2004 | Blaho | 345/426 |
| 2003/0076312 | A1 * | 4/2003 | Yokoyama | 345/204 |
| 2008/0297597 | A1 * | 12/2008 | Inomata et al. | 348/80 |
| 2010/0253852 | A1 * | 10/2010 | Fukuda | 348/649 |
| 2011/0182516 | A1 * | 7/2011 | Iwai et al. | 382/190 |

OTHER PUBLICATIONS

P. E. Debevec and J. Malik, "Recovering high dynamic range radiance maps from photographs", Proceeding of SIGGRAPH, pp. 369-378, Aug. 1997.
S. K. Nayar and T. Mitsunaga, "High dynamic range imaging: spatially varying pixel exposures", IEEE Conference on Computer Vison and Pattern Recognition, vol. 1, pp. 472-479, Jun. 2000.
Z. Li, S. Rahardja, S. Yao, J. Zheng and W. Yao, "High dynamic range compression by half quadratic regularization", IEEE Conference on Image Processing, pp. 3169-3172, Nov. 2009.
Z. Farbman, R. Fattal, D. Lischiski and R. Szeliski, "Edge-preserving decompositions for multi-scale tone and detail manipulation", ACM Transactions on Graphics-Proceedings of ACM SIGGRAPH, vol. 27, Aug. 2008.
E. Reinhard, M. Stark, P. Shirley and J. Ferwerda, "Photographic tone reproduction for digital images", ACM Transactions on Graphics-Proceedings of ACM SIGGRAPH, vol. 21, Jul. 2002.

(Continued)

*Primary Examiner* — Ali Bayat
(74) *Attorney, Agent, or Firm* — K. David Crockett, Esq.; Niky Economy Syrengelas, Esq.; Crockett & Crockett, PC

(57) ABSTRACT

Embodiments provide a method for merging a plurality of first digital pictures, wherein each first digital picture includes a plurality of pixel values. The method includes extracting details from the plurality of first digital pictures. The method further includes combining the pixel values of the plurality of first digital pictures to generate a combined digital picture. The method further includes modifying the combined digital picture with the extracted details to generate a merged digital picture.

15 Claims, 3 Drawing Sheets

(56) References Cited

OTHER PUBLICATIONS

T. Mertens, J. Kautz and F. V. Reeth, "Exposure fusion", Pacific Conference on Computer Graphics and Applications, Nov. 2007.

P. Burt and T. Adelson, "The laplacian pyramid as a compact image code", IEEE Transactions on Communication, COM-31:532-540, 1983.

A. A. Goshtasby, "Fusion of multi-exposure images", Image and Vision Computing, vol. 23, pp. 611-618, 2005.

B. A. Olshausen and D. J. Field, "Emergence of simple-cell receptive field properties by learning a sparse code for natural images", Nature, vol. 381, pp. 607-609, 1996.

R. C. Gonzalez and R. E. Woods, Digital image processing, Prentice Hall, 2002.

* cited by examiner

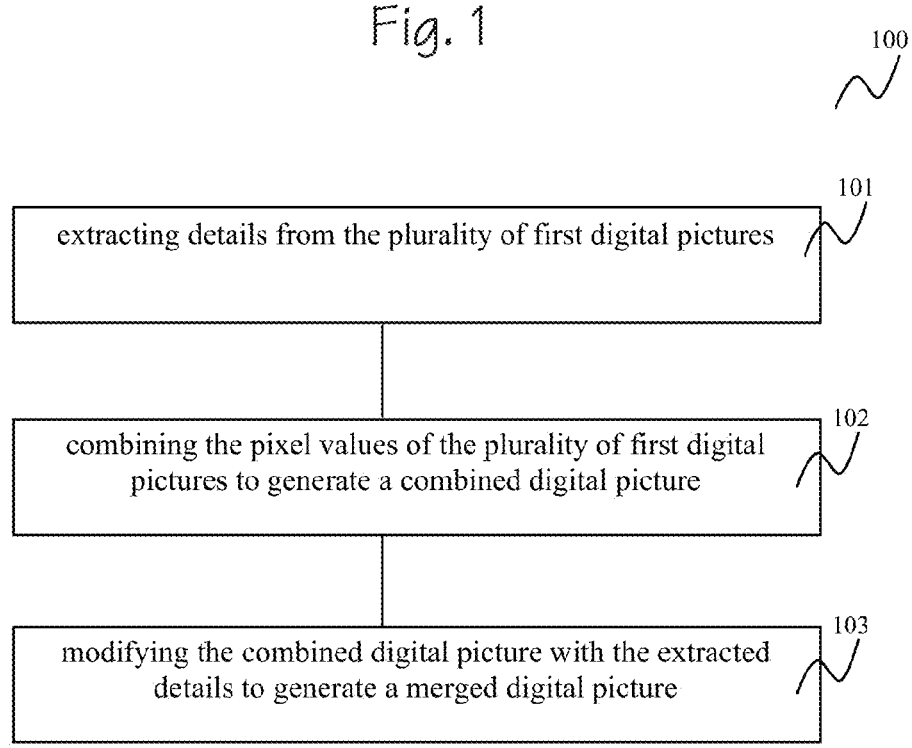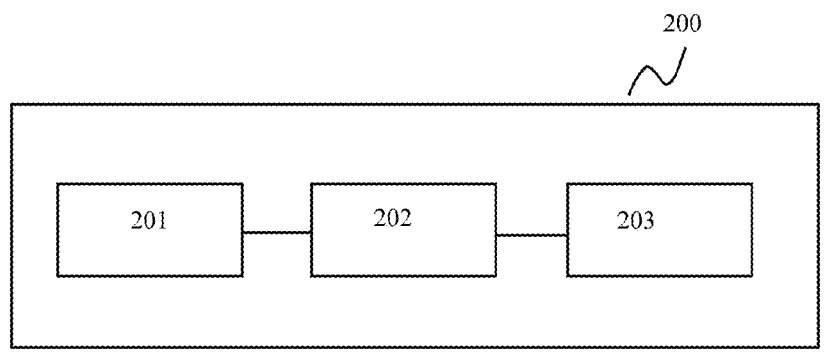

METHOD AND A DEVICE FOR MERGING A PLURALITY OF DIGITAL PICTURES

The present application claims the benefit of U.S. provisional patent applications 61/433,534 (filed on 18 Jan. 2011) and 61/461,658 (filed on 21 Jan. 2011), the entire contents of which are incorporated herein by reference for all purposes.

FIELD OF THE INVENTIONS

Embodiments relate generally to a method and a device for merging a plurality of digital pictures.

BACKGROUND OF THE INVENTIONS

Due to optical limitation of ordinary cameras, it is often impossible to capture the entire dynamic range of a real scene in a single image when there is large irradiance variation in the real scene. In an attempt to cover the entire dynamic range of the real scene, one way is to capture a set of differently exposed images and synthesize these images into a high dynamic range (HDR) image [cf. 1, 2], in which a pixel is represented by three 32-bit float point numbers. Although this HDR image is generally able to reproduce the real scene and is theoretically perceived by human eyes, the HDR image cannot be directly displayed or printed out because of low dynamic ranges of monitors and printers. Therefore, to visualize the HDR image, many tone mapping algorithms have been proposed to convert HDR image into low dynamic range (LDR) image [cf. 3, 4, 5], but these solutions are not so ideal for mobile devices in which there are obvious limitations.

Recently, a new image fusion technology, called exposure fusion, was proposed to overcome this problem. The input of exposure fusion is a set of differently exposed images. The output is an LDR image rather than an HDR image as in the above solution. The challenge of exposure fusion is how to seamlessly merge the information of input images together. As objects in the input images have obvious intensity gap, it is necessary for the image fusion algorithms to find some way to make the objects' intensity changes smoothly in the output image. Several methods were proposed to address this problem. In Mertens et al's method [cf. 6], all input images were scaled into several down-sampled layers by using the Laplacian pyramid [cf. 7]. A weighting factor that was calculated by taking the luminance, contrast and color information of a pixel into consideration was introduced to blend each layer of the input images. Although this method can provide visually pleasing result, the output image often lacks of detail information, as the smoothing effect of the Laplacian pyramid results in loss of details. In Goshtasby's method [cf. 8], all input images are firstly divided into blocks. Among the blocks at the same spatial location, the block with maximum entropy was selected to build the output image. A spatial Gaussian filter was then applied to remove the seam between neighboring blocks. Clearly, if a block has two objects that are with different intensity, the small object will be sacrificed. In addition, an abrupt intensity change at block boundary of neighboring block in merged image of input images with different content could be visually annoying and object covering these blocks would leave artificial variation in luminance.

SUMMARY

Various embodiments provide a method and a device for merging a plurality of digital pictures, which solves at least partially the above mentioned problems.

In one embodiment, a method for merging a plurality of first digital pictures is provided, wherein each first digital picture includes a plurality of pixel values. The method may include extracting details from the plurality of first digital pictures. The method may further include combining the pixel values of the plurality of first digital pictures to generate a combined digital picture. The method may further include modifying the combined digital picture with the extracted details to generate a merged digital picture.

In one embodiment, a device for merging a plurality of first digital pictures is provided, wherein each first digital picture includes a plurality of pixel values. The device may include an extractor configured to extract details from the plurality of first digital pictures. The device may further include a combiner configured to combine the pixel values of the plurality of first digital pictures to generate a combined digital picture. The device may further include a modifier configured to modify the combined digital picture with the extracted details to generate a merged digital picture.

It should be noted that the embodiments described in the dependent claims of the independent method claim are analogously valid for the corresponding device claim where applicable, and vice versa.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 1 shows a method for merging a plurality of first digital pictures in one embodiment;

FIG. 2 shows a device for merging a plurality of first digital pictures in one embodiment;

DETAILED DESCRIPTION OF THE INVENTIONS

Figure 3:
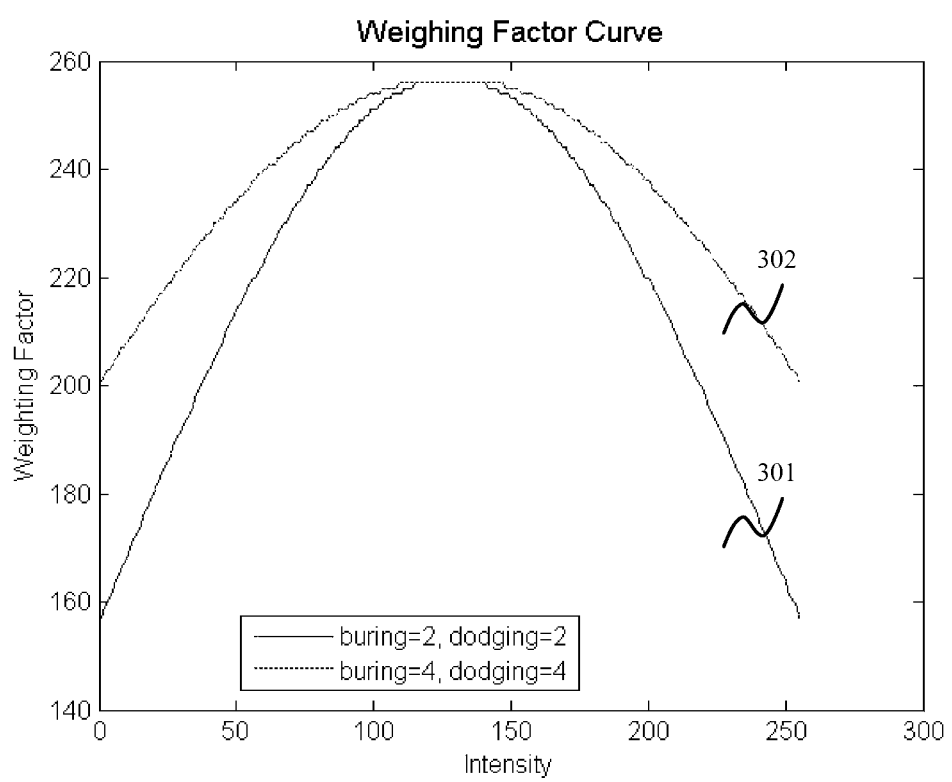
FIG. 3 shows the weighting factor curve for the weighting factor $w_{B,1}(z)$ with different settings of $\tau_{burning}$ and $\tau_{dodging}$ in one exemplary embodiment.

The following detailed description refers to the accompanying drawings that show, by way of illustration, specific details and embodiments in which the invention may be practiced. These embodiments are described in sufficient detail to enable those skilled in the art to practice the invention. In this regard, directional terminology, such as "top", "bottom", "front", "back", "leading", "trailing", etc, is used with reference to the orientation of the Figure(s) being described. Because components of embodiments can be positioned in a number of different orientations, the directional terminology is used for purposes of illustration and is in no way limiting. Other embodiments may be utilized and structural, logical, and electrical changes may be made without departing from the scope of the invention. The various embodiments are not necessarily mutually exclusive, as some embodiments can be combined with one or more other embodiments to form new embodiments. The following detailed description therefore, is not to be taken in a limiting sense, and the scope of the present invention is defined by the appended claims.

The word "exemplary" is used herein to mean "serving as an example, instance, or illustration". Any embodiment or design described herein as "exemplary" is not necessarily to be construed as preferred or advantageous over other embodiments or designs.

FIG. 1 illustrates a method 100 for merging a plurality of first digital pictures according to one embodiment. Each first digital picture may include a plurality of pixel values. The method 100 includes 101 extracting details from the plurality of first digital pictures. The method 100 further includes 102 combining the pixel values of the plurality of first digital pictures to generate a combined digital picture. The method 100 further includes 103 modifying the combined digital picture with the extracted details to generate a merged digital picture. In one embodiment, step 101 may be configured to be carried out simultaneously with step 102. In an alternative embodiment, step 101 may be carried out before or after step 102. Step 103 is configured to be carried out after steps 101 and 102.

In other words, in one embodiment, a plurality of first digital pictures may be merged to generate a merged digital picture (i.e. an output image). Illustratively, each of the plurality of digital pictures may be a low dynamic range (LDR) image, and the merged digital picture may also be a LDR image. Each first digital picture may include a plurality of pixel values. The plurality of first digital pictures may be a set of digital pictures taken for a same scene under different exposures or lighting conditions, for example. Due to the optical limitation of ordinary camera, it is often difficult to capture the entire content of a real scene. For example, a first object in a first digital picture of the plurality of first digital pictures at a first exposure may be well presented but the first object in a second input digital picture at a second exposure may be under or over exposed. Similarly, a second object in the first input digital picture, which may be over or under exposed may be well presented in the second input digital picture. The method may be used to smoothly merge the plurality of the input first digital pictures into a single LDR image which is content-enriched image containing the information of all input first digital pictures. In one embodiment, the method may include combining the pixel values of the plurality of first digital pictures to generate a combined digital picture. The combined digital picture may include a base layer or a plurality of base layers. The base layers are responsible for providing overall perception of the output LDR image, such as field of depth, color, and so on. The method may further include extracting details from the plurality of first digital pictures. The extracted details may be used to prevent the detail loss from the output image (i.e. the merged digital picture), for example. The method may further include modifying the combined digital picture with the extracted details to generate the merged digital picture. Illustratively, the modification of the combined digital picture with the extracted details may include multiplication of the combined digital picture with the extracted details.

In one embodiment, combining the pixel values of the plurality of first digital pictures includes averaging the pixel values of the plurality of first digital pictures over the first digital pictures to generate an average digital picture. In a further embodiment, averaging the pixel values of the plurality of first digital pictures over the first digital pictures includes weighted averaging of the pixel values of the plurality of first digital pictures. For example, all the pixel values for a same pixel (x, y) throughout all the first digital pictures may be averaged or weighted averaged to generate a combined pixel value for pixel (x, y) of the combined digital picture (or average digital picture).

In one embodiment, each first digital picture includes, for each of a plurality of pixels, a pixel value for each of a plurality of colors. In this embodiment, combining the pixel values of the plurality of first digital pictures includes, for each pixel and each color, combining the pixel values of the plurality of first digital pictures for the pixel and the color. In a further embodiment, combining the pixel values of the plurality of first pictures for the pixel and the color includes averaging the pixel values of the plurality of first digital pictures for the pixel and the color. For example, the plurality of colors may include red, green and blue. Each first digital picture may include, for each pixel (x, y), a pixel value R(x,y) for red color, a pixel value G(x,y) for green color, and a pixel value B(x,y) for blue color. Illustratively, combining the pixel values of the plurality of first digital pictures may include, for each pixel (x,y) and each color (each of red, green, and blue), combining the pixel values of the plurality of first pictures for pixel (x,y) and that color. For example, for red color and pixel (x,y), pixel values R(x,y) of all the plurality of first digital pictures may be combined, e.g. by averaging or weighted averaging the pixel values R(x,y) of all the first digital pictures, to generate a combined pixel value for pixel (x,y) and for red color of the combined digital picture (or average digital picture).

In one embodiment, extracting details from the plurality of first digital pictures includes determining a gradient field for each of the plurality of first digital pictures and averaging the gradient field over the plurality of first digital pictures to generate an averaged gradient field. In a further embodiment, averaging the gradient field over the plurality of first digital pictures includes weighted averaging of the gradient field over the plurality of first digital pictures. For example, a guidance field may be firstly generated by using the gradient fields computed from luminance components of all input images to include all desired details. This embodiment will be further illustrated with reference to equation (5). In this context, a gradient field generally specifies the rate of change of pixel values at each pixel location and may be computed from an input image. A guidance field may be composed from gradient fields.

In one embodiment, extracting details from the plurality of first digital pictures further includes determining a detail layer based on the averaged gradient field. In a further embodiment, determining the detail layer based on the averaged gradient field includes solving a quadratic optimization problem, which may be formulated on the extraction of small scale details from the guidance field. The quadratic optimization problem may be called "small scale detail extraction problem". This embodiment will be further illustrated with reference to equation (6).

In one embodiment, each first digital picture includes a pixel value for each pixel of a plurality of pixels and the detail layer includes a detail layer pixel value for each pixel of the plurality of pixels. The detail layer may be used to adjust the sharpness of the output LDR image (i.e. the merged digital picture). In a further embodiment, the combined digital picture includes a combined pixel value for each pixel of the plurality of pixels, and modifying the combined digital picture with the extracted details includes combining, for each pixel, the combined pixel value with the detail layer pixel value. In a still further embodiment, combining the combined pixel value with the detail layer pixel value includes multiplying the combined pixel value with the detail layer pixel value. This embodiment will be further illustrated with reference to equation (1).

In one embodiment, the first digital pictures are low dynamic range (LDR) pictures and the merged digital picture is a low dynamic range picture. That is, in one embodiment, the set of input LDR digital pictures may be merged into a LDR picture directly. In contrast, according to some conventions techniques, a set of differently exposed LDR images is firstly synthesized into a high dynamic range (HDR) image and then the HDR image is converted into LDR image by using tone-mapping algorithms.

In one embodiment, the first digital pictures show the same scene at different lighting conditions. For example, there may be several lighting sources, and different number of lighting sources may be applied to different digital pictures of the plurality of first digital pictures.

In one embodiment, the first digital pictures show the same scene at different exposures.

The method 100 may be carried out by a transitory or non-transitory device. Illustratively, the method may be executed by a computer. For example, a computer readable medium may have a program recorded thereon and the program may be executed to make the computer to perform the method 100.

FIG. 2 shows a device 200 for merging a plurality of first digital pictures according to one embodiment. Each first digital picture includes a plurality of pixel values. The device 200 may correspond to the method 100 as described herein.

The device 200 may include an extractor 201 configured to extract details from the plurality of first digital pictures. The device 200 may further include a combiner 202 configured to combine the pixel values of the plurality of first digital pictures to generate a combined digital picture. The device 200 may further include a modifier 203 configured to modify the combined digital picture with the extracted details to generate a merged digital picture.

The method for merging a plurality of first digital pictures as described herein will now be described according to an exemplary embodiment as follows.

Assuming there are a number of N first digital pictures taken for a same scene under different conditions (e.g. exposure conditions and/or lighting conditions); $k(1 \leq k \leq N)$ denotes the kth digital picture of the N first digital pictures and $(x,y)$ denotes a pixel of the kth digital picture; $R^k(x,y)$, $G^k(x,y)$, $B^k(x,y)$ denote the red, green and blue values of pixel $(x,y)$ in the kth exposed digital picture; $I^k(x,y)$ is the luminance value of pixel $(x, y)$ in the log domain. For example, $I^k(x,y)$ may be computed as $$\log(0.299 R^k(x,y) + 0.587 G^k(x,y) + 0.114 B^k(x,y)).$$

The method of merging the number of N digital pictures may include:

Step A: Extracting details from the plurality of N digital pictures (e.g. extracting a detail layer $I^D(x,y)$ by using all $I^k(x,y)$'s);

Step B: Combining the pixel values of the plurality of N digital pictures to generate a combined digital picture (e.g. integrating base layers, $R^B(x,y)$, $G^B(x,y)$ and $B^B(x,y)$ for the red, green and blue components by using all $R^k(x,y)$'s, $G^k(x,y)$'s, $B^k(x,y)$'s, respectively);

Step C: Modifying the combined digital picture with the extracted details to generate a merged digital picture, e.g. synthesize an output LDR image by combining the detail layer $I^D(x,y)$ with the base layer of each color channel separately as $$\begin{pmatrix} R^O(x,y) \\ G^O(x,y) \\ B^O(x,y) \end{pmatrix} = \begin{pmatrix} \min\left(255, R^B(x,y) \cdot \left(e^{I^D(x,y)}\right)^\theta\right) \\ \min\left(255, G^B(x,y) \cdot \left(e^{I^D(x,y)}\right)^\theta\right) \\ \min\left(255, B^B(x,y) \cdot \left(e^{I^D(x,y)}\right)^\theta\right) \end{pmatrix} \quad (1)$$

where e is the Euler's number, $R^O(x,y)$ is the merged pixel value for red color and for pixel $(x,y)$ in the merged digital picture; $G^O(x,y)$ is the merged pixel value for green color and for pixel $(x,y)$ in the merged digital picture; $B^O(x,y)$ is the merged pixel value for blue color and for pixel $(x,y)$ in the merged digital picture; and $\theta$ is a constant and its function is to control the sharpness of the output image (i.e. the merged digital picture). The default value of $\theta$ may be selected as 1. The detail layer $I^D(x,y)$, as well as the base layers $R^B(x,y)$, $G^B(x,y)$ and $B^B(x,y)$ may be computed using Equations (6) and (10), respectively.

In one embodiment, the color of the final image may be adjusted by converting the RGB space into the HSI space and tuning the S component according to a user's preference [cf. 10]. In this context, HSI space is a color space where H stands for hue, S stands for saturation, and I stands for intensity. HSI and RGB may be converted between each other.

Step A (i.e. extract details from the plurality of N digital pictures) will now be described in more detail as follows according to an exemplary embodiment.

Exposure fusion usually includes smoothing effect to prevent seam from the merged picture, which causes fine details to be lost or blurred in the output image. To prevent the loss of details, according to one embodiment, desired details are extracted from the plurality of first digital pictures by solving a new quadratic optimization problem, which may be referred to as "small scale detail extraction problem".

A guidance field $\nabla \tilde{I}(x,y)$ may be firstly built up to contain desired details of first digital pictures where $(\nabla \tilde{I}(x,y) = (\nabla \tilde{I}_v(x,y), \nabla \tilde{I}_h(x,y))^T)$, where $\nabla \tilde{I}_v(x,y)$ is guidance field in the vertical direction and $\nabla \tilde{I}_h(x,y)$ is guidance field in the horizontal direction. Normally, the gradient of a pixel with the largest absolute value along different exposures corresponds to the most desirable detail at the position. However, in under exposure areas, it is highly possible for the maximum gradient to be corrupted with noise. Instead of generating the guidance field by using the maximum gradient, in one embodiment, the guidance field may be built up by using a weighted average of gradients over all exposures.

Illustratively, the following two weighting functions $w_{D,1}(z)$ and $w_{D,2}(z)$ may be used to reduce the possible noise and to exclude sharp edges from the guidance field. One weighting function $w_{D,1}(z)$ may be defined on the luminance value of a pixel and is provided as $$w_{D,1}(z) = \begin{cases} \dfrac{1}{1+\exp((16-z)/16)}, & \text{if } 0 \leq z \leq 128 \\ \dfrac{1}{1+\exp((z-235)/4)}, & \text{otherwise} \end{cases} \quad (2)$$

where z is the luminance value of a pixel (i.e. $z = e^{I^k(x,y)}$). The other weighting function $w_{D,2}(z)$ may be defined on the amplitude of gradients, which is based on the observation that the distribution of derivatives in nature images is a generalized Laplacian one [9]. The weighting function $w_{D,2}(z)$ may be given as $$w_{D,2}(z) = \dfrac{1}{1+\exp(16 \cdot \exp(z) - 25)}. \quad (3)$$

The overall weighting function of a gradient may be computed by $$W_h^k(x,y) = w_{D,1}(e^{I^k(x,y)}) w_{D,1}(e^{I^k_{x+1,y}}) w_{D,2}(\nabla I_h^k(x,y))$$

$$W_v^k(x,y) = w_{D,1}(e^{I^k(x,y)}) w_{D,1}(e^{I^k_{x,y+1}}) w_{D,2}(\nabla I_v^k(x,y)). \quad (4)$$

where $W_h^k(x,y)$ is the overall weighting function for gradients in the horizontal direction, and $W_v^k(x,y)$ is the overall weighting function for gradients in the vertical direction.

The guidance field may be calculated as $$\nabla \bar{I}_v = \sum_{k=1}^{N} W_v^k(x,y) \cdot \nabla I_v^k(x,y) \Big/ \sum_{k=1}^{N} W_v^k(x,y) \quad (5)$$

$$\nabla \bar{I}_h = \sum_{k=1}^{N} W_h^k(x,y) \cdot \nabla I_h^k(x,y) \Big/ \sum_{k=1}^{N} W_h^k(x,y).$$

where $\nabla I_v^k(x,y)$ is gradient field in the vertical direction for pixel (x,y) of the kth digital picture of the plurality of N first digital pictures; and $\nabla I_h^k(x,y)$ is gradient field in the horizontal direction for pixel (x,y) of the kth digital picture of the plurality of N first digital pictures.

The detail layer may be extracted from the guidance field $\nabla \bar{I}(x,y)$ by solving the following quadratic optimization problem:

$$\operatorname*{argmin}_{I^D(x,y)} \left\{ \sum_{(x,y)} \left[ \lambda_d \cdot \Phi(\nabla I^D(x,y), \nabla \bar{I}(x,y)) + (I^D(x,y))^2 \right] \right\}, \quad (6)$$

where the first term of $\Phi(\nabla I^D(x,y) \nabla \bar{I}(x,y))$ measures the fidelity of the gradient field of detail layer with respect to the guidance field. The function $\Phi(X(x,y)Y(x,y))$ may be defined as $$\Phi(X(x,y), Y(x,y)) = \frac{(X_v(x,y) - Y_v(x,y))^2}{\varphi(Y_v(x,y))} + \frac{(X_h(x,y) - Y_h(x,y))^2}{\varphi(Y_h(x,y))}, \quad (7)$$

where $X_v(x,y)$ is the vertical component of $X(x,y)$, $X_h(x,y)$ is the horizontal component of $X(x,y)$; $Y_v(x,y)$ is the vertical component of $Y(x,y)$; $Y_h(x,y)$ is the horizontal component of $Y(x,y)$; the function $\phi(z)$ may be selected as $(|z|^\gamma + \epsilon)$ and the values of $\gamma$ and $\epsilon$ may be selected as 1.25 and 0.0001, respectively. The second term of $(I^D(x,y))^2$ is on the scales of pixels in the detail layer.

It is required that the scales of pixels in the detail layer are around 1. The regularization term $\lambda_d$ may be used to achieve a tradeoff between these two items $\Phi(\nabla I^D(x,y), \nabla \bar{I}(x,y))$ and $(I^D(x,y))^2$.

Step B (i.e. combining the pixel values of the plurality of N digital pictures to generate a combined digital picture) will now be described in more detail as follows.

The combined digital picture may include one or a plurality of base layers. Illustratively, each base layer may correspond to one color component. For example, if there are three color components red, green and blue, then the combined digital picture may include three base layers, i.e. a base layer for red, a base layer for green and a base layer for blue. The base layers may be integrated separately for all color components. Similar to the extraction of detail layer, two weighting functions $w_{B,1}(z)$ and $w_{B,2}(z_1,z_2,z_3)$ may be defined for the integration of base layers. In one embodiment, one weighting function $w_{B,1}(z)$ is to measure level of expose and the other $w_{B,2}(z_1,z_2,z_3)$ is to measure the colorfulness of a pixel. To prevent the base layers from color shifting, the weighting function $w_{B,1}(z)$ may be computed by using the luminance component. Well-exposed pixels may be given large weighting factors and thus well-exposed pixels are dominant in the weighted averaging. Contrariwise, over or under exposed pixels may be partially or totally eliminated by the weighting factor. Based on the observation, a weighting function $w_{B,1}(z)$ with a 'Gauss' look is provided according to equation (8) in one embodiment, which has better adaptability to exposure fusion.

$$w_{B,1}(z) = \begin{cases} \exp\left(-\frac{(z-128)^2}{\tau_{burning} \cdot 128^2}\right); & \text{if } 0 \leq z \leq 128 \\ \exp\left(-\frac{(z-128)^2}{\tau_{dodging} \cdot 128^2}\right); & \text{otherwise,} \end{cases} \quad (8)$$

where z is the luminance value of a pixel; $\tau_{burning}$ and $\tau_{dodging}$ are two constants that may be used to control the strength of burning and dodging effects, respectively.

FIG. 3 shows the weighting factor curve 301 and 302 for the weighting factor $w_{B,1}(z)$. The horizontal axis is the intensity of the luminance, and the vertical axis is the value of the weighting factor $w_{B,1}(z)$. For curve 301, $\tau_{burning}$ is set to 2 and $\tau_{dodging}$ is set to 2. For curve 302, $\tau_{burning}$ is set to 4 and $\tau_{dodging}$ is set to 4. It can be seen that the width of weighting factor curve for weighting factor $w_{B,1}(z)$ is decided by the two constants $\tau_{burning}$ and $\tau_{dodging}$. The default values of $\tau_{burning}$ $\tau_{dodging}$ may be set as 2's. In one embodiment, user may interactively adjust the values of $\tau_{burning}$ and $\tau_{dodging}$. When the values of $\tau_{burning}$ and $\tau_{dodging}$ are decreased, the curve of weighting factor $w_{B,1}(z)$ becomes narrower. In this case, burning and dodging effects is enhanced. Most pixels of the output image may distribute in middle dynamic range. As such the output image may look sharp, colorful, but lack of depth field.

Besides the luminance of a pixel, the colorfulness of a pixel also may be considered for the overall weighting factor calculation. A pixel with saturated color may have a large weighting factor [cf. 6]. In one embodiment, weighting function $w_{B,2}(z_1,z_2,z_3)$ to measure the colorfulness of a pixel is provided as follows:

$$w_{B,2}(z_1, z_2, z_3) = \quad (9)$$

$$\begin{cases} v \cdot \left( \frac{1}{3 \times 255} \cdot \left( \sum_{i=1}^{3} \left| z_i - \frac{1}{3} \cdot \sum_{j=1}^{3} z_j \right|^p \right)^{\frac{1}{p}} - 1 \right) + 1; & \text{if } p < \infty \\ v \cdot \left( \frac{1}{255} \cdot \max_i \left\{ \left| z_i - \frac{1}{3} \cdot \sum_{j=1}^{3} z_j \right| \right\} - 1 \right) + 1; & \text{otherwise,} \end{cases}$$

where v is a constant and its function is to adjust the colorfulness of the final image. The default value of v may be set as 0.75. i is index of color channel; z is the pixel value in one color channel. For example, assuming i=1 represents the red color channel, then $z_1 = R^o(x,y)$ when i=1. p is an exponential parameter.

With the proposed weighting functions (8) and (9), base layers $R^B(x,y)$, $G^B(x,y)$, and $B^B(x,y)$ may be computed as:

$$\begin{pmatrix} R^B(x,y) \\ G^B(x,y) \\ B^B(x,y) \end{pmatrix} = \begin{pmatrix} \sum_{k=1}^{N} [R^k(x,y) W_B^k(x,y)] \Big/ \sum_{k=1}^{N} W_B^k(x,y) \\ \sum_{k=1}^{N} [G^k(x,y) W_B^k(x,y)] \Big/ \sum_{k=1}^{N} W_B^k(x,y) \\ \sum_{k=1}^{N} [B^k(x,y) W_B^k(x,y)] \Big/ \sum_{k=1}^{N} W_B^k(x,y) \end{pmatrix}, \quad (10)$$

where $W_B^k(x, y)$ is $$W^k(x,y) = w_{B,1}(e^{I^k(x,y)}), G^k(x,y), B^k(x,y)).$$

The method for merging a plurality of first digital pictures (i.e. exposure fusion algorithm) as described herein is evaluated by several sets of differently exposed images, which has indoor and outdoor scenes.

A set of differently exposed images (input images) has been fused using the method 100. Due to the optical limitation of ordinary camera, it is often difficult of capture the entire content of a real scene. Through the method 100 for merging a plurality of digital pictures as described herein, the optimally exposed areas of input images are smoothly merged into a single LDR image which is a content-enriched image containing the information of all input images.

The detail layer may enable interactive detail manipulation. Fusion result using different choices of parameters using the method 100 as described herein has shown that users may enhance the sharpness of output image through increasing the value of $\theta$ in Equation (1).

The optimal values of $\tau_{burning}$ and $\tau_{dodging}$ may be adaptive to the content of a scene. For an indoor scene, the perception of depth is generally not as important as outdoor scene, and the values of $\tau_{burning}$ and $\tau_{dodging}$ may be chosen relatively smaller. Smaller $\tau_{burning}$ and $\tau_{dodging}$ may result in strong burning and dodging effects. Then the information in dark and bright area may be more visible.

The method 100 described herein has been compared with two state-of-the-art exposure fusion methods in [cf. 6, 8] by testing several sets of differently exposed images. The result shows that all three methods produce images without artifacts. But when they are zoomed in, it can be found that the method as described herein preserves details much better than the methods in both cf. [6] and cf. [8] which is due to the contribution of detail layer as described herein. As such, the method as described herein may be used to produce sharper images.

For most exposure fusion schemes, the lighting condition is required to be the same during capturing of input images (i.e. the plurality of first digital pictures). Experiments have shown that the method 100 as described herein is applicable for merging a plurality of digital pictures, which show the same scene at different lighting conditions (e.g. different lighting positions and lighting strengths).

Figure 4:
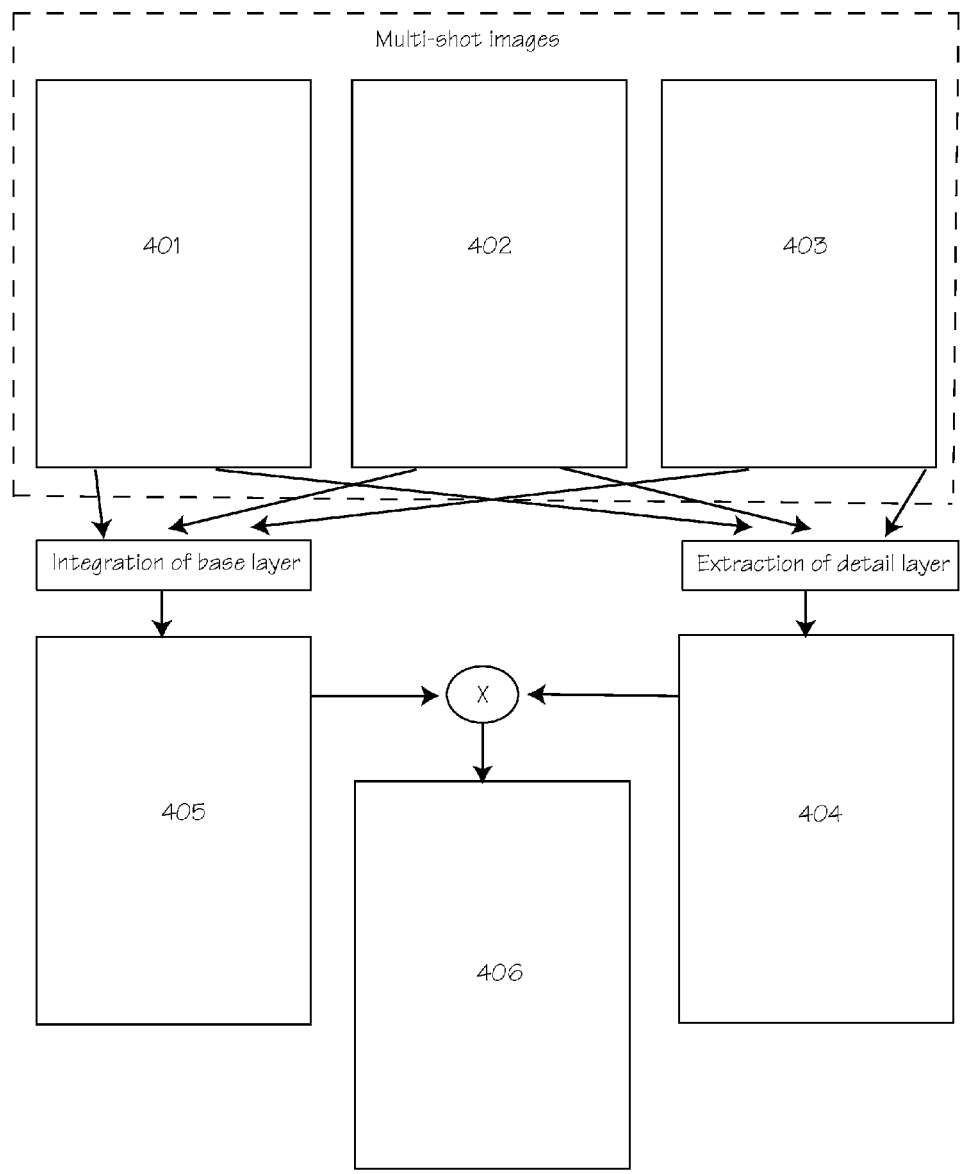
FIG. 4 shows a flowchart of the method of merging a plurality of first digital pictures according to an exemplary embodiment.

FIG. 4 shows a flowchart of the method of merging a plurality of first digital pictures according to one exemplary embodiment. In a first step, digital pictures 401, 402 and 403 are input for further merging, wherein pictures 401, 402 and 403 are LDR images captured for a same scene under different exposures. In a second step, details of the digital pictures 401, 402 and 403 are extracted and a detailed layer 404 is built up. Through this, the desired details of all input images may be combined into a single detail layer. A main problem of exposure fusion schemes is detail loss. Through increasing or decreasing the local contrast of detail layer, the detail sharpness of output image may be manipulated. Also in the second step, pixel values of the digital pictures 401, 402, and 403 are combined and a base layer 405 is formed in RGB channels separately. In other words, a base layer is integrated from the input images 401, 402 and 403 to provide overall perception of output image. Thereafter, in a third step, the base layer 404 is modified with the detailed layer 404 to generate a merged LDR digital picture 406, e.g. each color channel of base layer is multiplied with the detail layer and the final output image is generated.

Various embodiments provide an image fusion technique. Given inputs of differently exposed low dynamic range (LDR) images of a scene, the technique outputs a processed LDR image. It is observed that the under/over exposed areas of one LDR image can correspond to well-exposed areas of other LDR images. Using the exposure fusion technique as described herein, the well-exposed areas of all input images may be fused seamlessly into a single LDR image.

In various embodiments, a method for merging a plurality of first digital pictures is provided which may fuse a set of differently exposed low dynamic range (LDR) images into an LDR image with desired details. The method may includes two main parts: one is to extract fine details from all input images as a detail layer that contains all fine details of all input images by addressing a new quadratic optimization problem. This detail layer not only prevents the detail loss from the output image but also can provide better detail manipulation. Interactive mode is also provided which allows users to tune the appearance of the output image according to their preferences. The other is to integrate a base layer for each color component. The base layers provide the overall perception of the output image, such as color and field of depth. The base and detail layers are combined together to synthesize the final LDR image with all desired details. To meet different users' preferences, the method also supports an interactive mode, which allows users to control sharpness and global contrast of the output image. Besides differently exposed images, the method may also be used to fuse different exposed videos.

In various embodiments, a exposure fusion algorithm is provided to synthesize an LDR image directly from a set of differently exposed LDR images. The algorithm is composed of two key components, i.e. integration of base layers and extraction of a detail layer. The detail layer is used to adjust the sharpness of the output LDR image. This is extracted by addressing a new quadratic optimization problem, which is called "small scale detail extraction problem". A guidance field is firstly generated by using the luminance components of all input images to include all desired details. The new quadratic optimization problem is then formulated on the extraction of small-scale details from the guidance field. Its cost function comprises two terms. One is on the fidelity of the gradient field of small-scale details to the guidance field. The other is on the energy of the desired small-scale details. A regularization factor is adopted to obtain a tradeoff between them. Finally, the detail layer may be extracted by using an iterative method to solve the new optimization problem. The base layers are integrated by using weighted average function in equation (10). Through amplifying the detail layer, the sharpness of the final output image may be enhanced. The construction of detail layer may overcome the common disadvantage of exposure fusion, such as loss of details [cf. 6, 8]. Method as described herein is applicable to multi-lighting images and dynamic scenes.

While the invention has been particularly shown and described with reference to specific embodiments, it should be understood by those skilled in the art that various changes in form and detail may be made therein without departing from the scope of the invention as defined by the appended claims. The scope of the invention is thus indicated by the appended claims and all changes which come within the meaning and range of equivalency of the claims are therefore intended to be embraced.

Throughout the description, the following references have been cited:

[1] P. E. Debevec and J. Malik, "Recovering high dynamic range radiance maps from photographs", Proceeding of SIGGRAPH, pp. 369-378, August 1997.

[2] S. K. Nayar and T. Mitsunaga, "High dynamic range imaging: spatially varying pixel exposures", IEEE Conference on Computer Vison and Pattern Recognition, Vol. 1, pp. 472-479, June 2000.

[3] Z. Li, S. Rahardja, S. Yao, J. Zheng and W. Yao, "High dynamic range compression by half quadratic regularization", IEEE Conference on Image Processing, pp. 3169-3172, November 2009.

[4] Z. Farbman, R. Fattal, D. Lischiski and R. Szeliski, "Edge-preserving decompositions for multi-scale tone and detail manipulation", ACM Transactions on Graphics-Proceedings of ACM SIGGRAPH, Vol. 27, August 2008.

[5] E. Reinhard, M. Stark, P. Shirley and J. Ferwerda, "Photographic tone reproduction for digital images", ACM Transactions on Graphics-Proceedings of ACM SIGGRAPH, Vol. 21, July 2002.

[6] T. Mertens, J. Kautz and F. V. Reeth, "Exposure fusion", Pacific Conference on Computer Graphics and Applications, November 2007.

[7] P. Burt and T. Adelson, "The laplacian pyramid as a compact image code", IEEE Transactions on Communication, COM-31:532-540, 1983.

[8] A. A. Goshtasby, "Fusion of multi-exposure images", Image and Vision Computing, Vol. 23, pp. 611-618, 2005.

[9] B. A. Olshausen and D. J. Field, "Emergence of simple-cell receptive field properties by learning a sparse code for natural images", Nature, Vol. 381, pp. 607-609, 1996.

[10] R. C. Gonzalez and R. E. Woods, *Digital image processing*, Prentice Hall, 2002.

We claim:

1. A method for merging a plurality of first digital pictures, each first digital picture comprising a plurality of pixels, each of the plurality of pixels comprising a pixel value for each of a plurality of colors, the method comprising:

extracting details from the plurality of first digital pictures;
   combining the pixel values of the plurality of first digital pictures to generate a combined digital picture, comprising:
   for each pixel and each color, combining the pixel values of the plurality of first digital pictures for the pixel and the color; and
   modifying the combined digital picture with the extracted details to generate a merged digital picture.

2. The method according to claim 1, wherein combining the pixel values of the plurality of first digital pictures comprises averaging the pixel values of the plurality of first digital pictures over the first digital pictures to generate an average digital picture.

3. The method according to claim 2, wherein averaging the pixel values of the plurality of first digital pictures over the first digital pictures comprises weighted averaging of the pixel values of the plurality of first digital pictures.

4. The method according to claim 1, wherein combining the pixel values of the plurality of first pictures for the pixel and the color comprises averaging the pixel values of the plurality of first pictures for the pixel and the color.

5. The method according to claim 1, wherein extracting details from the plurality of first digital pictures comprises determining a gradient field for each of the plurality of first digital pictures and averaging the gradient field over the plurality of first digital pictures to generate an averaged gradient field.

6. The method according to claim 5, wherein averaging the gradient field over the plurality of first digital pictures comprises weighted averaging of the gradient field over the plurality of first digital pictures.

7. The method according to claim 5, wherein extracting details from the plurality of first digital pictures further comprises determining a detail layer based on the averaged gradient field.

8. The method according to claim 7, wherein determining the detail layer based on the averaged gradient field comprises solving a quadratic optimization problem.

9. The method according to claim 7, wherein each first digital picture comprises a pixel value for each pixel of a plurality of pixels and the detail layer comprises a detail layer pixel value for each pixel of the plurality of pixels.

10. The method according to claim 9, wherein the combined digital picture comprises a combined pixel value for each pixel of the plurality of pixels and wherein modifying the combined digital picture with the extracted details comprises combining, for each pixel, the combined pixel value with the detail layer pixel value.

11. The method according to claim 10, wherein combining the combined pixel value with the detail layer pixel value comprises multiplying the combined pixel value with the detail layer pixel value.

12. The method according to claim 1, wherein the first pictures are low dynamic range pictures and the merged digital picture is a low dynamic range picture.

13. The method according to claim 1, wherein the first digital pictures show the same scene at different lighting conditions.

14. The method according to claim 1, wherein the first digital pictures show the same scene at different exposures.

15. A device for merging a plurality of first digital pictures, each first digital picture comprising a plurality of pixels, each of the plurality of pixels comprising a pixel value for each of a plurality of colors, the device comprising:

an extractor configured to extract details from the plurality of first digital pictures;
   a combiner configured to combine the pixel values of the plurality of first digital pictures to generate a combined digital picture, wherein for each pixel and each color, the pixel values of the plurality of first digital pictures are combined for the pixel and the color; and
   a modifier configured to modify the combined digital picture with the extracted details to generate a merged digital picture.

* * * * *